Patented Dec. 5, 1922.

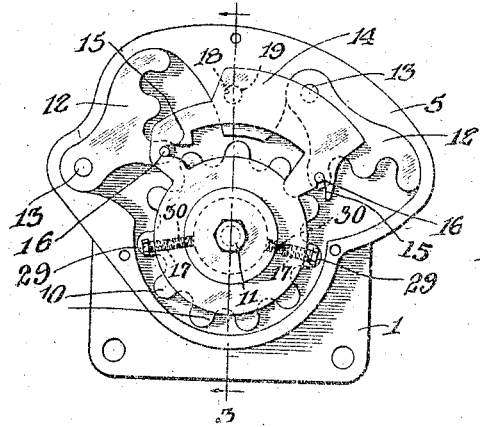

1,437,696

UNITED STATES PATENT OFFICE.

HENRY VOLDEN, OF PORTLAND, OREGON.

SAFETY BRAKE FOR MOTOR-DRIVEN VEHICLE.

Application filed December 13, 1920. Serial No. 430,340.

*To all whom it may concern:*

Be it known that I, HENRY VOLDEN, a citizen of the United States, residing at Portland, in the county of Multnomah and State of Oregon, have invented certain new and useful Improvements in Safety Brakes for Motor-Driven Vehicles; and I do hereby declare the following to be a full, clear, and exact description of the invention, such as will enable others skilled in the art to which it appertains to make and use the same.

This invention relates to safety brakes for motor driven vehicles and more particularly to an automatic safety brake adapted to prevent such a vehicle from reversing its direction upon the stoppage of the motor when the vehicle is situated on an incline. The object of the invention is to provide a simple and efficient dependable device of the character indicated.

The invention consists in the novel structure, arrangement and combination of parts hereinafter more particularly described and claimed.

One sheet of drawings accompanies the specification as part thereof in which like reference characters indicate like parts throughout.

Figure 1 is a rear view of the device with the back plate removed showing the locking means in their inoperative position.

Fig. 2 is a view similar to Fig. 1 showing the locking means in operative position.

Fig. 3 is a side elevation partly in section showing the device applied to the differential housing of an automobile.

Fig. 4 is a transverse medial sectional view.

Fig. 5 is a detail of the control member partly broken away to show the frictional shaft engaging springs.

Referring to the drawings, the device consists of a plate 1 adapted to be secured in the place of the ordinary back plate of the differential housing 31 of an automobile. This plate carries suitable bearing 7 for a stub shaft 3 on one end of which is fixedly secured a bevel gear 8 adapted to engage with the gears in the differential housing in such manner as to drive said stub shaft 3 in the same direction and at the same speed as the main propeller drive shaft of the vehicle. Fig. 3 illustrates the device as applied to a differential housing 31, parts being broken away to show gear 8 and the rear live axle 32 on the near side. Extending rearwardly from the plate 1 is an extension 2 having on its outer circumference annular shoulder 4. Rotatably mounted on extension 2 and secured thereon by a suitable face plate 26 is a housing member 5 which is provided with suitable bearing 7 for the stub shaft 3. A spiral spring 27 surrounds member 2 having one end engaged with the plate 1 and the other end engaged with the housing member 5. On the end of stub shaft 3 within the housing 5 is fixedly mounted a gear 9 having rounded teeth 10 and in suitable recesses in the housing 5 are pivotally mounted as at 13, dogs 12 having rounded teeth adapted to comate with the rounded teeth of the gear 9 and carrying backwardly extending pins 16. Rotatably mounted on stub shaft 3 behind gear 9 is a control member 14 provided with radial frictional elements such as compression springs 30 controlled by screws 29 adapted to engage stub shaft 3 so that control member 14 is normally carried with stub shaft 3 unless otherwise prevented. Control member 14 is also provided with cam surfaces 15 terminating in stops adapted to engage with pins 16 on dogs 12 so that when stub shaft 3 rotates in its normal clockwise direction, dogs 12 are held in their elevated position out of engagement with gear 9 as illustrated in Fig. 1. Upon the reversal of stub shaft 3, however, cam surfaces 15 of control member 14 will engage pin 16 and depress same bringing dogs 12 into engagement with gear 9 and locking the shaft, except in so far as housing member 5 is permitted to rotate on member 2 under the restraint of the spiral spring 27.

To permit of the reversal of the direction of travel of the vehicle when desired, a locking member 19 is provided in housing 5 extending therethrough and adapted to engage a recess 18 on the inner face of control member 14. The locking member 19 is normally held in retracted or unlocked position by means of a spiral spring 20 compressed between the face of housing 5 and the head member 23 mounted on the end of locking bar 19. The head member 23 is engaged by an arcuate track of channel cross section 22 which is controlled by means of rods 21 and 25 from the operator's seat in the vehicle to positively control locking member 19 as may be desired.

A closure plate 28 is provided to be secured on the back of the housing 5 and in operation this housing would preferably be filled with heavy lubricant similar to the practice with regard to the differential housing.

Modifications in the precise form, arrangement or numbers of the various parts will readily suggest themselves to those skilled in the art within the scope of the present invention.

Having thus described my invention what I claim is:

1. A braking device comprising a shaft positively geared to the drive shaft of a vehicle, a supporting member for said axle adapted to be fixedly secured to the frame of the vehicle, a housing member rotatably carried on said shaft and supporting member, spring means interposed between said supporting member and said housing member to control the rotation of said housing on said supporting member, a gear carried by said stub shaft within said housing member and braking means carried by said housing member and adapted to engage and lock said gear.

2. A braking device comprising a shaft, a supporting member for said shaft, a housing rotatably mounted on said supporting member, resilient means on said supporting member and connected to said housing to control rotation of the housing on the support, a gear fixedly mounted on the shaft within the housing, dogs pivotally mounted within the housing adapted to engage and lock the gear, pins on said dogs, and a control member frictionally mounted on said shaft adjacent the gear having cam surfaces adapted to engage the pins on the dogs to hold the same out of engagement with the gear when said control member is rotated by the shaft in one direction and to depress said dogs into engagement with the gear upon reversal of the direction of rotation of said shaft.

3. In a braking device having a shaft, a support for said shaft, a gear fixedly secured to said shaft, a housing for said gear rotatably mounted on said support, braking means carried by said housing to engage said gear, control means for said braking means frictionally carried by said shaft; means for locking said control means comprising a spring controlled bolt carried by the housing adapted to engage a recess in the control member and having a head, an arcuate track member of channel cross section adapted to engage said head, and means carried by the supporting member for operating said track member.

4. A braking device comprising a shaft, a supporting member for said shaft, a gear fixedly mounted on said shaft and a housing rotatably mounted on said supporting member, resilient means connecting said supporting member and said housing to control the rotation of the latter on the former, and braking means carried by said housing adapted to engage and lock said gear.

5. A braking device comprising a shaft, a supporting member for said shaft, a gear fixedly mounted on said shaft and a housing rotatably mounted on said supporting member and shaft, resilient means connecting said supporting member and said housing to control the rotation of the latter on the former, braking means comprising dogs pivotally mounted within said housing having backwardly extending pins, and a control member rotatably mounted on said shaft having radial bores, springs compressed in said bores to frictionally engage the shaft and cam faces on said control member adapted to engage the pins on said dogs to control the same.

6. A braking device comprising a driving shaft, supporting means for the shaft, brake means carried by the shaft, brake means rotatively mounted relative to the shaft, control means for said rotatively mounted brake means, and resilient means interposed between said rotatively mounted brake means and the drive shaft support.

In testimony whereof I affix my signature.

HENRY VOLDEN.